No. 839,531. PATENTED DEC. 25, 1906.
W. S. WESTON.
MEANS FOR MANUFACTURING COMPOSITE RAIL BRACES.
APPLICATION FILED OCT. 22, 1904.

2 SHEETS—SHEET 1.

Witnesses:
Lillian Prentice
Katharine Gerlach

Inventor:
Wm. S. Weston
By Prince & Fisher
attys

No. 839,531. PATENTED DEC. 25, 1906.
W. S. WESTON.
MEANS FOR MANUFACTURING COMPOSITE RAIL BRACES.
APPLICATION FILED OCT. 22, 1904.

2 SHEETS—SHEET 2.

Witnesses:
Lillian Prentice
Katharine Gerlach

Inventor:
Wm. S. Weston
By Pierce & Fisher
Attys

UNITED STATES PATENT OFFICE.

WILLIAM S. WESTON, OF CHICAGO, ILLINOIS.

MEANS FOR MANUFACTURING COMPOSITE RAIL-BRACES.

No. 839,531.     Specification of Letters Patent.     Patented Dec. 25, 1906.

Application filed October 22, 1904. Serial No. 229,519.

*To all whom it may concern:*

Be it known that I, WILLIAM S. WESTON, a citizen of the United States, residing at Chicago, county of Cook, and State of Illinois, have invented a certain new and useful Means for Manufacturing Composite Rail-Braces, of which I do declare the following to be a full, clear, and exact description, reference being had to the accompanying drawings, forming part of this specification.

This invention has for its object to provide an improved apparatus for the rapid and economical manufacture of a composite rail-brace heretofore devised by me, said rail-brace comprising a plate-metal—*e. g.*, wrought-iron or soft steel—base portion and a cast-metal body united thereto. In the attainment of this object of invention I first cut the base-plates for the composite braces from flat rolled steel or iron, and preferably in the same operation punch the spike-holes in the bases and the irregular perforations into which the cast metal of the base-bodies shall flow in order to effect a secure interlocking of the bodies with the bases. Having thus punched and cut the base-plates, I then place a number of these plates in a multiple mold in fixed predetermined position in front of permanent mold-faces, each of which mold-faces is a duplicate of the face of the rail for which braces are specifically designed, and when the base-plates are thus fixed in position I place over them and over the permanent mold-faces a mold having cavities adapted to form with said base-plates and said permanent duplicate mold-faces the walls of the mold, and, finally, I deliver the cast metal to the cavities to form the bodies of the braces in interlocking engagement with the base-plates.

My improved mold is formed of separable sections, one of these sections being provided with means for holding in proper position the base-plates of the braces to be formed and one of the sections of the mold being formed with a working face that is a duplicate of the side face of the rail in connection with which the braces are to be used.

The invention will next be described as to its details and will be particularly pointed out in the claims at the end of this specification.

Figure 1:
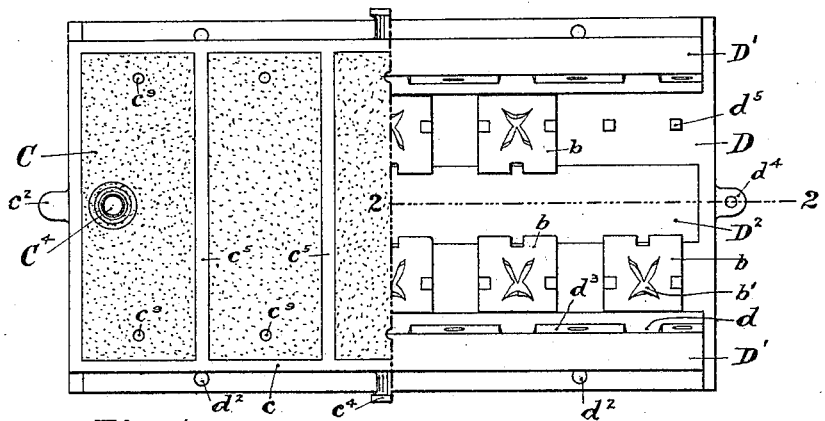
Figure 2:
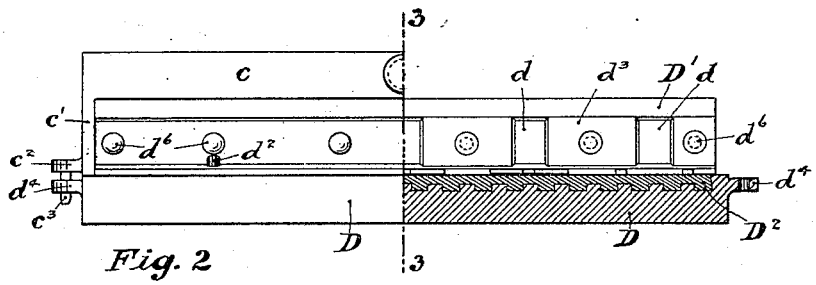
Figure 4:
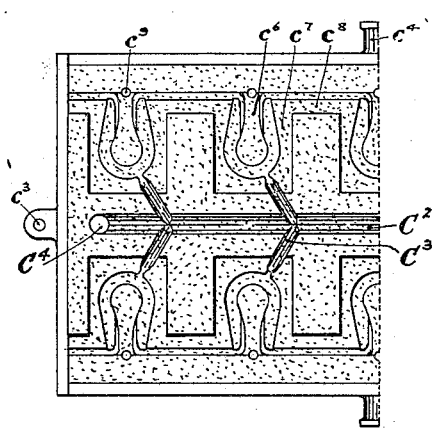
Figure 3:
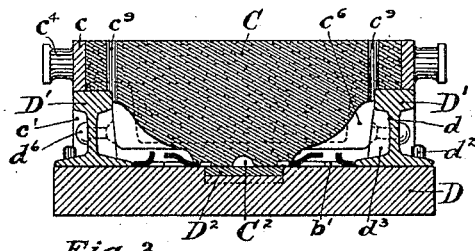
Figure 5:
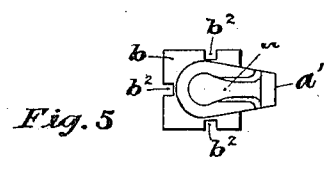
Figure 6:
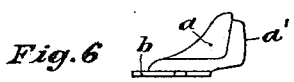
Figure 7:
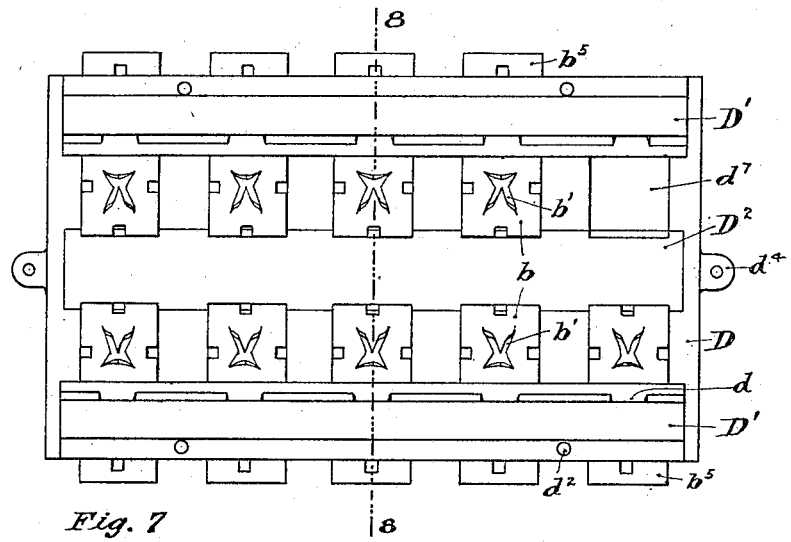
Figure 8:
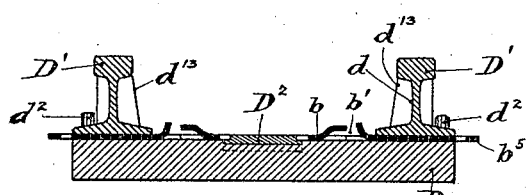
Figure 9:
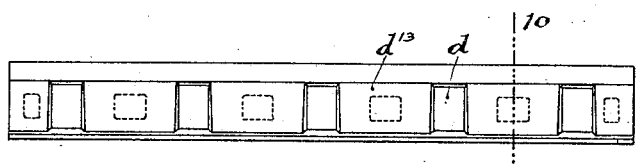
Figure 11:
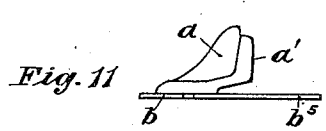
Figure 10:

Figure 1 is a plan view of a mold embodying my invention, one-half of the upper section or cope of the mold being removed. Fig. 2 is a view, partly in side elevation and partly in central vertical section, through the section-line 2 of Fig. 1. Fig. 3 is a view in vertical cross-section on line 3 3 of Fig. 2. Fig. 4 is an inverted plan view of one-half of the cope or upper section of the mold. Fig. 5 is a detail plan view of a finished rail-brace produced by a mold illustrated in Figs. 1–4 of the drawings. Fig. 6 is a side view of the composite rail-brace shown in Fig. 5. Fig. 7 is a plan view of the drag or lower section of a modified form of mold embodying my invention. Fig. 8 is a view in vertical section on line 8 8 of Fig. 7. Fig. 9 is a detail side view of one of the side rails of the drag shown in Fig. 8. Fig. 10 is a view in vertical section on line 10 10 of Fig. 9. Fig. 11 is a view in side elevation of a composite rail-brace for the formation of which the mold illustrated in Figs. 7–10 is specifically designed.

The rail-brace shown by Figs. 5 and 6 of the drawings, and for the manufacture of which the mold illustrated in Figs. 1–4 is specifically designed comprises a cast-metal body portion $a$ and a plate-metal base $b$, to which the body portion $a$ is united in the casting operation. By reference to Figs. 1 and 3 of the drawings it will be seen that the base-plate $b$ of the composite brace is punched up centrally to form the ragged or irregular hole $b'$, about the edges of which the metal of the body $a$ will flow and set in the casting operation. Each of the base-plates $b$ is also formed at its side and rear edges with notches $b^2$, adapted to receive the spikes whereby the braces will be attached to the railway-ties. The face $a'$ of the brace-body is the portion intended to bear against the rail and should conform as nearly as possible in outline to the side of the rail in connection with which it is to be used. As will be seen, it is highly important that the part of the mold which forms this face should be an exact duplicate of the rail-surface for which the brace is intended and that to insure a true bearing both on the tie and against the rail the base-plate should be placed in the mold in a predetermined fixed position relative to the duplicate rail-surface.

In carrying out my invention I form the mold of two separable sections—viz., the upper section or cope C and the bottom section or drag D. Preferably the drag or bottom section D of the mold comprises a heavy metal base, from the upper face of which rise the sides D'. These sides D' comprise a plurality of working faces $d$ that conform in contour to the side of the specific railway-rail in connection with which the braces are designed to be used. As shown, these sides D' are each formed from a section of a railway-rail and are attached to the bottom plate or base of the drag by pins or bolts $d^2$, that pass through the outer base-flanges of the rail. The working faces $d$ of the mold-cavities are interspaced by suitable blocks $d^3$, that may be attached to the web of the side rails D' by suitable rivets $d^6$. From the upper face of the base or bottom of the drag D project the metal pins or studs $d^5$, that are arranged in front of the working faces $d$ of the mold, these pins or studs $d^5$ being adapted to enter the side notches $b^2$ of the base-plate $b$, and thus hold the base-plates in fixed position in front of the working faces $d$, as clearly shown at the right-hand side of Fig. 1 of the drawings.

The base-plate D of the drag has a plate $D^2$, of plumbago or similar non-conducting material, inlaid along the center and opposite the main channel, through which the molten metal will be delivered to the cavities of the mold. The cope of the mold C comprises a metal frame having side bars $c$ and end plates $c'$, the side bars being adapted to rest upon the heads of the rails D' of the drag, while the end plates $c'$ are adapted to extend across the ends of the rails D' and down to the base-plate of the drag D. The end plates $c'$ are preferably provided with lugs $c^2$, from which depend pins $c^3$, adapted to enter holes formed in correspondingly-disposed lugs $d^4$, that project from the ends of the base of the drag D. The side bars $c$ of the cope are provided with projecting trunnions $c^4$, whereby the cope may be lifted, and these side bars $c$ are united by cross-bars $c^5$ in suitable number, these bars extending at their centers downwardly, as shown by the dotted line in Fig. 3 of the drawings, at points opposite the space-blocks $d^3$ between the working faces $d$ of the side rails D'. The frame of the cope C will support the molding-sand that will be packed therein, as shown in Figs. 3 and 4. The sand within the cope will be molded to form the various cavities $c^6$, each of these cavities corresponding in shape to the body portion $a$ of the brace illustrated in Figs. 5 and 6 of the drawings and with cavities $c^7$ and $c^8$, adapted to receive the base-plates $b$ of the braces and the inner base-flanges of the side rails D' of the drag. The several mold-cavities $c^6$ are provided with vent-openings $c^9$, and the fluid metal will be conducted to these cavities from the main channel or runner $C^2$ and branch channels $C^3$, the main channel $C^2$ being provided at one end with an induction opening $C^4$, that leads through the top of the cope.

In practicing my invention the base-plates $b$ of the braces will first be punched, so as to form the openings $b'$, with their upset edges adapted to be embedded in the cast metal of which the bodies of the braces will be formed, and preferably at the same operation the plates $b$ will be provided with the notches $b^2$, adapted to receive the spikes, whereby the braces will be secured to the railway-ties. The base-plates $b$ will then be set in position in front of the working faces $d$ of each of the rails D', as shown in Fig. 1, the pins $d^5$, that project upward from the base of the drag, entering the notches $b^2$ of the braces and serving to hold the base-plates $b$ in fixed predetermined position with respect to the working faces $d$ of the mold. The cope, with the cavities in the under face thereof, as shown in Fig. 4, will then be placed over the drag, so that the cavities $c^6$ shall come opposite the working faces $d$ of the rail D' of the drag and over the base-plates $b$. Fluid metal will then be poured into the mold, so as to fill the cavities $c^6$ and set about the upturned edges of the holes $b'$ in the base-plate $b$, thereby securely interlocking the base-plates to the cast-metal bodies of the braces. After the casting operation the cope will be lifted off, and the braces will then be finished by shaking them from the mold and removing sprues and fins. The sides D' of the drag being formed, as they preferably are, from sections of the exact pattern of rail for which the braces are to be made insure the accurate fitting of the braces to the rails for which they are intended, and inasmuch as the base-plates of the braces are held during the casting operation in the same fixed position with respect to the base-flanges of the rails that these base-plates will occupy when in use it follows that the finished braces will be of precisely the proper outline for the rails for which they are specifically intended.

In the form of the invention illustrated in Figs. 7-10 of the drawings the construction of the drag is suitably modified to adapt it for the manufacture of the style of rail-brace illustrated in Fig. 11 of the drawings. This rail-brace differs from that illustrated in Fig. 6 only in respect that the base-plate $b$, which is united to the cast-metal body $a$, is provided with an extension $b^5$, adapted to project beneath the railway-rail in connection with which it is to be used. In order to permit this modified construction of rail-brace to be formed, the base of the drag D has the side rails D' connected thereto in such manner that they can readily be removed, and this can be accomplished by simply forming the holes in the outer flanges of the rails D of such size as to freely admit the retaining-pins $d^2$. The base-plate of the drag D in this modified form of the invention is provided as in the construction above described, with a central plate $D^2$, of suitable non-conducting material, and in the surface of the drag D are formed the lateral depressions $d^7$, (see Fig. 7,) adapted to receive the base-plate $b$ and their extensions $b^5$ of the braces. The side rails D' in this modified form of the invention have their webs formed with openings, through which passes the cast metal whereof the spacing-blocks $d^{13}$ will be formed. By reference to Figs. 9 and 10, it will be seen that these spacing-blocks $d^{13}$ are cast upon opposite sides of the rails D' and define the extent of the working faces $d$ of the molds at the sides of the rails. In using this modified form of drag last described the base-plates $b$, having the extension $b^5$, will be set within the channels or cavities $d^7$ of the drag, after which the side rails D' will be placed in position above the base of the drag, in which position they will be held by the pins $d^2$. With this modified form of drag a cope like that hereinbefore described and illustrated upon Sheet 1 of the drawings will be used, and the casting operation will be as hereinbefore set forth. It will be understood, of course, that at the end of the casting operation and after the cope has been removed the side rails D' will be lifted, so as to permit the braces to be withdrawn and cleaned.

The present invention affords a simple and effective means for the rapid and economical manufacture of composite rail-braces having base-plates united to their bodies in the casting operation.

Having thus described my invention, what I claim as new, and desire to secure by Letters Patent, is—

1. A mold for casting composite rail-braces of the character described, comprising separable sections, one of said sections being provided with means for holding the base-plates of the braces and a section of a railway-rail in fixed definite relation, as described, said rail forming one of the working faces of the mold.

2. A mold for casting composite rail-braces of the character described, comprising a drag and a cope, the drag being provided with a side having a plurality of working faces corresponding in outline to the outline of the side of a railway-rail and with a series of spacing-blocks whereby interspaced mold-faces are formed, said drag being also provided with means for holding the base-plates of the braces in fixed position opposite said working faces during the casting operation.

3. A mold for casting composite rail-braces of the character described comprising a drag and cope, the drag having a metal base portion and having side portions formed of sections of railway-rails, said rail-sections being provided upon their inner faces with spacing-blocks whereby interspaced mold-faces are formed.

4. A mold for casting railway-rail braces, comprising two separable sections, one of said sections having a metallic support with a section of a railway-rail formed separate therefrom and mounted thereon to constitute part of the mold-cavity wall, means for holding said railway-rail section in fixed relation and the other section of the mold being shaped to constitute part of the working face of the mold and being provided with suitable gates and vents to the mold-cavity, substantially as described.

5. A mold for casting railway-rail braces, comprising a permanent mold-section and a molded mold-section, the permanent mold-section being provided with means for releasably holding the base-plates of the braces and a section of a railway-rail in fixed relation, with the base-plates extending beneath said rail-section and said rail-section forming part of the mold-cavity wall, substantially as described.

WILLIAM S. WESTON.

Witnesses:
    LILLIAN PRENTICE,
    KATHARINE GERLACH.